(12) United States Patent
Barber

(10) Patent No.: US 8,743,766 B2
(45) Date of Patent: Jun. 3, 2014

(54) METHOD AND SYSTEM FOR NETWORK DISCOVERY AND SELECTION IN WIRELESS NETWORK SYSTEMS

(75) Inventor: Phillip Barber, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 1256 days.

(21) Appl. No.: 11/935,278

(22) Filed: Nov. 5, 2007

(65) Prior Publication Data

US 2008/0165738 A1  Jul. 10, 2008

Related U.S. Application Data

(60) Provisional application No. 60/871,127, filed on Dec. 20, 2006.

(51) Int. Cl.
*H04H 20/71* (2008.01)
*H04W 4/06* (2009.01)
*H04W 80/04* (2009.01)

(52) U.S. Cl.
CPC ............... *H04W 4/06* (2013.01); *H04W 80/04* (2013.01)
USPC ........................................ 370/312; 370/310.2

(58) Field of Classification Search
CPC ......... H04L 2012/5608; H04W 84/12; H04W 88/08; H04W 80/04; H04W 88/06; H04W 84/18
USPC .............. 370/310.2, 312, 328, 331, 332, 338, 370/349
See application file for complete search history.

(56) References Cited

U.S. PATENT DOCUMENTS

| | | | |
|---|---|---|---|
| 6,128,490 A * | 10/2000 | Shaheen et al. | ............... 455/434 |
| 6,256,509 B1 * | 7/2001 | Tanaka et al. | ................. 455/515 |
| 6,374,109 B1 | 4/2002 | Shaheen et al. | |
| 2003/0195003 A1 | 10/2003 | Cao et al. | |

FOREIGN PATENT DOCUMENTS

| | | |
|---|---|---|
| CN | 1269950 A | 10/2000 |
| KR | 10-2006-0013294 A | 2/2006 |
| WO | WO 2006/013294 A1 | 9/2006 |

OTHER PUBLICATIONS

PCT International Search Report and PCT Written Opinion of the International Searching Authority for PCT/CN2007/071266, forms PCT/ISA/220 and PCT/ISA/237, mailed Mar. 27, 2008, Applicant: Huawei Technologies Co., Ltd., et al., 12 pages.

Chinese Office Action, Application No. 200780045568.3, dated Apr. 22, 2010, 7 pages.

(Continued)

*Primary Examiner* — Brenda H Pham
(74) *Attorney, Agent, or Firm* — Slater & Matsil, L.L.P.

(57) ABSTRACT

Method and system for network discovery and selection in wireless network systems. According to an embodiment, the present invention provides a wireless communication system. The system includes a first access network that is connected to a content service network. The first access network includes a base station to provide wireless access to wireless devices within a first region through a plurality of communication channels. The plurality of communication channels includes a broadcast channel. The first access network is configured to send broadcast messages through the broadcast channel. The broadcast message includes a first broadcast message, which includes channel availability information. The system also includes a wireless device. The wireless device includes an antenna and a wireless interface. The wireless interface is adapted to receive at least the first broadcast message.

12 Claims, 2 Drawing Sheets

(56) References Cited

OTHER PUBLICATIONS

Korean Office Action, Korean Application No. 10-2009-7009300, Applicant: Huawei Technologies Co., Ltd., Dated: Nov. 12, 2010, 7 pages.

"802.16 IEEE Standard for Local and metropolitan area networks; Part 16: Air Interface for Fixed Broadband Wireless Access Systems," IEEE Std 802.16™-2004, Oct. 1, 2004, 894 pages.

Korean Patent Office, Partial English Translation of Rejection Decision of Chinese Application No. 200780045568.3; (Sep. 24, 2001); 7 pages.

* cited by examiner

METHOD AND SYSTEM FOR NETWORK DISCOVERY AND SELECTION IN WIRELESS NETWORK SYSTEMS

CROSS-REFERENCES TO RELATED APPLICATIONS

This application claims priority to U.S. Provisional Application No. 60/871,127, filed Dec. 20, 2006, which is incorporated by reference herein.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates in general to telecommunication techniques. More particularly, the invention provides a method and system for providing allocation of network resources. In a specific embodiment, the present invention provides a method and system for providing network discovery and selection in wireless network systems by using network broadcast messages. Certain embodiments of the invention are used in the WiMAX (IEEE 802.16) standard. Merely by way of example, the invention is described as it applies to wireless access network, but it should be recognized that the invention has a broader range of applicability. For example, the invention can be applied to any communication product that supports periodic broadcast of network information.

Techniques for wireless communications have progressed through the years. For example, satellite wireless communication networks have been developed where satellites are use to relay voice communication among wireless. There are other techniques as well. Over the recent years, the "cellular" wireless communication networks have become one of the most widely used technique for providing wireless communication.

A wireless network usually includes base stations and mobile stations. For example, a mobile station (MS) refers to a station that is to be used while in motion or during halts at unspecified geographic locations. As an example, the mobile station is a mobile communication device. In another example, the mobile station is a cellular phone. In yet another example, a base station (BS) refers to a set of equipment that can provide connectivity, management, and control for one or more mobile stations. As merely an example, a connective service network refers to a set of network functions that provide IP connectivity services to mobile stations. In an exemplary process flow, a MS obtains radio access from a BS. Through the BS, the MS obtains IP services.

In a telecommunication network, a mobile station is typically connected to a local network, which provides, among other things, radio connectivity. The local network also establishes a connection between the mobile station and a network where a variety of services (e.g., routing, Internet protocol routing, etc.) are provided. FIG. 1 is a simplified diagram illustrating a conventional telecommunication network. As an example, the conventional telecommunication network 100 as illustrated in FIG. 1 complies with WiMAX wireless networks.

As shown, the mobile station 101, which is sometimes referred to as mobile subscriber station when the mobile station is subscribed to a specific network service provider, is connected to an access service network. For example, the mobile station 101 is connected to the access service network (ASN) 102. For example, the ASN 102 is configured to provide radio access to the mobile station 101. According to an embodiment, the ASN 102 includes a base station (BS) for providing radio access. For example, the BS refers to a generalized equipment set for providing connectivity, management, and control of mobile stations. In addition, the ASN 102 includes a gateway for interfacing with other networks. For example, the gateway allows the mobile station 101 to communicate with other ASNs (e.g., ASN 106). As another example, the gateway allows the mobile station 101 to connect to a connectivity service network (CSN) 104. As an example, the connectivity service network refers to a set of network functions that provide, among other things, IP connectivity service to mobile stations. Often, the CSNs also store policies associated with mobile stations.

Typically, a mobile station connects to a CSN that stores the network policies associated with the mobile station through an ASN. As an example, the CSN is often referred as network service provider from a management perspective. Similarly, the ASN is often referred to as network access provider from a management perspective. Typically, the ASN and/or the CSN stores information associated with individual wireless devices. As an example, the information includes location information of a specific wireless device. As another example, the information includes context information for a wireless device.

When a wireless device moves and/or enters into a geographical location, the wireless device performs a network detection and selection process to obtain wireless connectivity. For example, in various conventional techniques the wireless device scans for available channels. Unfortunately, these conventional techniques are often inadequate for various reasons.

Therefore, an improved method for providing wireless communication network is desired.

BRIEF SUMMARY OF THE INVENTION

The present invention relates in general to telecommunication techniques. More particularly, the invention provides a method and system for providing allocation of network resources. In a specific embodiment, the present invention provides a method and system for providing network discovery and selection in wireless network systems by using network broadcast messages. Certain embodiments of the invention are used in the WiMAX (IEEE 802.16) standard. Merely by way of example, the invention is described as it applies to wireless access network, but it should be recognized that the invention has a broader range of applicability. For example, the invention can be applied to any communication product that supports Periodic Broadcast of Network Information.

According to an embodiment, the present invention provides a wireless communication system. The system includes a first access network that is connected to a content service network. The first access network includes a base station to provide wireless access to wireless devices within a first region through a plurality of communication channels. The plurality of communication channels includes a broadcast channel. The first access network is configured to send broadcast messages through the broadcast channel. The broadcast message includes a first broadcast message, which includes channel availability information. The system also includes a wireless device. The wireless device includes an antenna and a wireless interface. The wireless interface is adapted to receive at least the first broadcast message. The wireless device includes a processor that is configured to process at least the first broadcast message and select a wireless connection based at least one the first broadcast message. The wireless device is adapted to connect to the selected wireless connection through the wireless interface.

According to another embodiment, the present invention provides a method for performing network detection and selection in a wireless network. The method includes providing a content service network. The method also includes providing a first access network that is connected to the content service network, the first access network including a base station that is configured to provide wireless access to wireless devices within a first region through a plurality of communication channels. The method also includes allocating a broadcast channel from the plurality of communication channels. Also, the method includes providing a wireless device, the wireless device including an antenna and a wireless interface. The method additionally includes sending a first broadcast message by the first access network. The first broadcast message includes channel availability information. The method further includes receiving the first broadcast message by the wireless device. Moreover, the method includes processing the first broadcast message. Also, the method includes selecting a wireless connection based at least one the first broadcast message.

It is to be appreciated that the various embodiments of the present invention provide advantages over conventional techniques. In various embodiments, the present invention provides a scheme for efficiently detect and select wireless connection through the use of broadcast messages. Among other things, by using broadcast messages, wireless devices looking for wireless connection does not have to scan for available channels, but only to select available channels based on information indicated by the broadcast messages. In comparison to conventional techniques, embodiments of the present invention are more efficient, saving time, energy, and network resources. In addition, it is to be appreciated that embodiments of the present invention can be implemented for conventional network techniques and standards. For example, various embodiments of the present invention are compatible with conventional techniques and easily implemented. There are other benefits as well.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates in general to telecommunication techniques. More particularly, the invention provides a method and system for providing allocation of network resources. In a specific embodiment, the present invention provides a method and system for providing network discovery and selection in wireless network systems by using network broadcast messages. Certain embodiments of the invention are used in the WiMAX (IEEE 802.16) standard. Merely by way of example, the invention is described as it applies to wireless access network, but it should be recognized that the invention has a broader range of applicability. For example, the invention can be applied to any communication product that supports s periodic broadcast of network information.

As explained above, network detection and discovery are important aspects of wireless networks. In conventional wireless networks, ASNs are configured to provide wireless access. Depending on the application, the ASN can be fixed and/or mobile. Typically, an ASN has a limited range within which to serve mobile devices. When a mobile device enter, re-enter, and/or leave the range served by the ASN, a network discovery and detection process needs to be performed so that the ASN can properly serve the mobile device.

Often, more than one ASNs provide wireless access within a geographical location. For example, a mobile device determines which of the ASNs to use based on various factors. Sometimes, mobile devices may also switch from one ASN to another through handover processes between ASNs, which can be one the same network or different networks. As described above, mobile devices often rely on the network detection and selection (ND&S) to learn the networks availability for entry and re-entry and to determine suitability for selection, and make final selection to conduct network entry or re-entry.

A conventional ND&S practice in wireless ASNs is for the mobile device to scan each available channel, or some subset of available channels, for the presence of a wireless ASNs that meet the subscriber device's requirements. Often, such procedures lead to lengthy searching processes, increased power consumption, and protracted delays. Also, the scanning processes of various channels can be an active event, including both uplink and downlink transmissions. As a result, active scanning processes increase power consumption on the mobile device further and usurp valuable ASN transmission resources. If the active scanning does not directly result in network entry, then those consumed ASN transmission resources are wasted. For example, mobile devices will then unnecessarily scan more available channels in order to find suitable ASN service. The process of unnecessary scanning processes consume power on the mobile device and during of the ND&S process.

Figure 2:
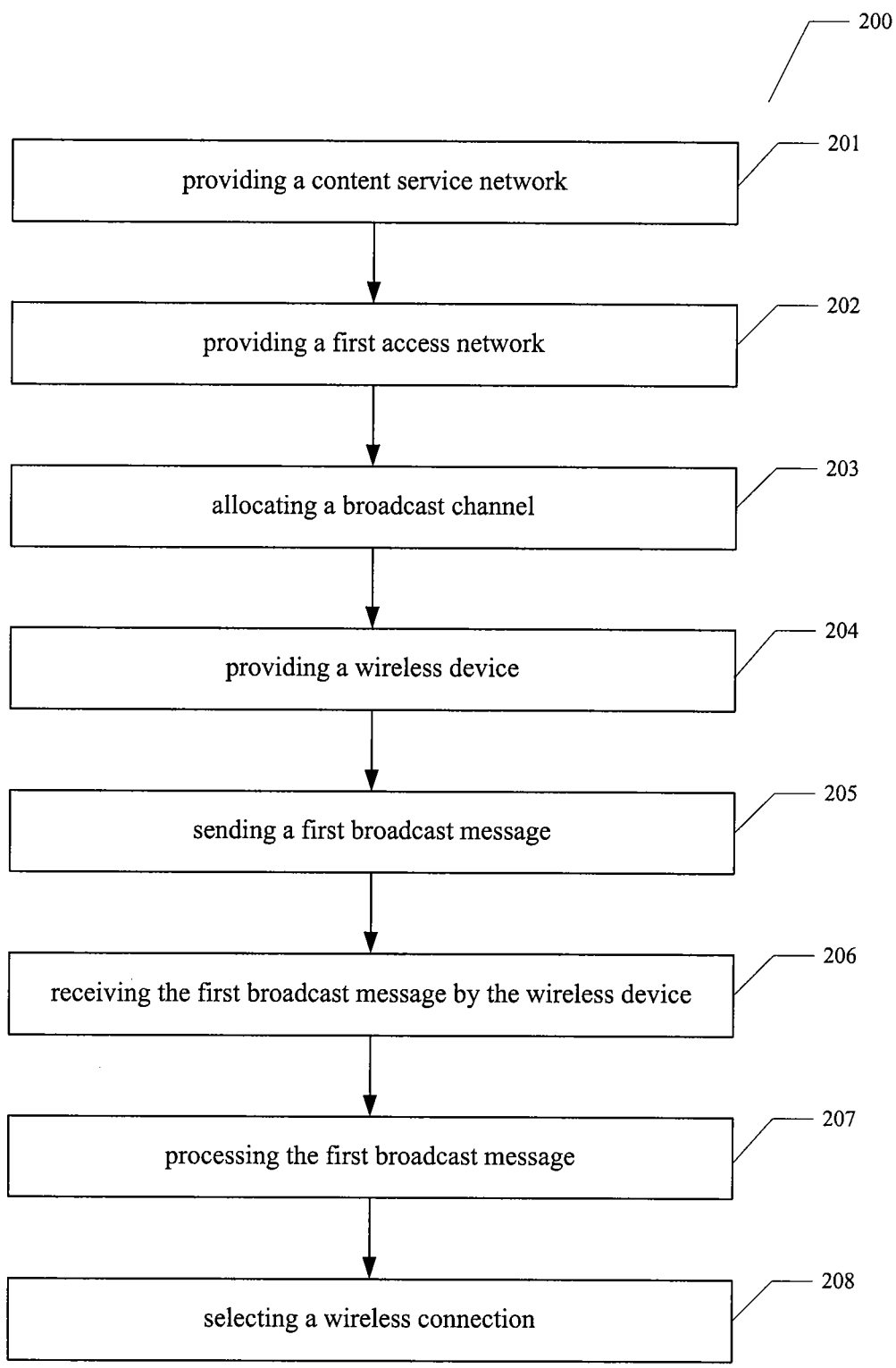
FIG. 2 is simplified flow diagram illustrating a network detection and selection process according to an embodiment of the present invention.

FIG. 2 is simplified flow diagram illustrating a network detection and selection process according to an embodiment of the present invention. This diagram is merely an example, which should not unduly limit the scope of the claims. One of ordinary skill in the art would recognize many variations, alternatives, and modifications. For example, various steps can be added, removed, modified, repeated, rearranged, replaced, and/or overlapped.

As shown in FIG. 2, a process 200 includes the following steps:
1. providing a content service network; 201
2. providing a first access network; 202
3. allocating a broadcast channel; 203
4. providing a wireless device; 204
5. sending a first broadcast message by the first access network; 205
6. receiving the first broadcast message by the wireless device; 206
7. processing the first broadcast message; 207 and
8. selecting a wireless connection. 208

At step 201, a content service network is provided. For example, the content service network is configured to provide IP network connectivity to mobile devices through access networks. For example, the content service network includes various network gateways connecting to voice and/or data networks.

At step 202, a first access network is provided. The first access network is connected to the content service network. The first access network is configured to provide various types of connectivity, such as wireless and/or wired connection. In an embodiment, the first access network includes a base station. The base station is configured to provide wireless access to wireless devices within a region. Typically, area of the region is limited by the signal strength of the base station. In various types of networks, such as WiMAX network, wireless connectivity is provided through a number of communication channels. For example, channels may be based on frequency bands, time slots, encryption code, etc.

At step 203, a broadcast channel is allocated. According to the present invention, these communication channels include a broadcast channel that is used for providing system messages. For example, the broadcast channel specific in accordance with the WiMAX standard.

At step 204, a wireless device is provided. Among other things, the wireless device including an antenna and a wireless interface. It is to be appreciated that the wireless device may be various types of devices, such as wireless phone, laptop, PDA, etc. According to a specific embodiment, the wireless device is adapted to listen to the broadcast channel and receive broadcast messages.

At step 205, the first access network sends a first broadcast message. Depending on the application, the first access network may be configured to send broadcast messages at predetermined time intervals. The first broadcast message may include information such as the channel availability of within an area that is a part of the first access network. The first broadcast message may also include other information, such as channel availability of nearby base stations that are parts of other different ASN(s), the physical operating characteristics of nearby base stations within a service area, current configuration of nearby base stations and access networks that may be accessible to the wireless device, the current and/or recent air interface and/or network resource loading of nearby base stations, and others. In a specific embodiment, the first broadcast message is in accordance with various network standards. For example, the first broadcast message is in accordance to the WiMAX standard.

In a specific embodiment, the first broadcast message may be a neighbor advertisement message. For example, the first access network supporting mobile functionality is be capable of transmitting an MOB_NBR-ADV management message at a periodic interval to identify the network and define the characteristics of neighbor base stations to potential wireless stations that seeking initial network entry or HO. For the compression of neighbor base stations' identifications using this message in broadcast messages (e.g., MOB_SCN-REP and MOB_MSHO-REQ messages). For example, base stations keep mapping-tables of neighbor base stations' MAC addresses and neighbor base station indices transmitted through broadcast message, often for each Configuration Change Count. Using these mapping-tables, base stations can derive 48-bit neighbor base stations' identification from neighbor base stations indices included in MOB_SCN-REP or MOB_MSHO-REQ message.

Now referring back to FIG. 2. At step 206, the wireless device receives the first broadcast message. As explained above, the wireless device listens and receives broadcast message from the first access service network to receive the first broadcast message. In situations where the wireless device is able to reach to multiple access service networks, the wireless device may receive broadcast messages from some and/or all of the networks.

At step 207, the wireless device processes the first broadcast message. Depending on the application, the wireless device may obtain various information contained in the first broadcast message. As explained above, the information may include channel availability of the first access network, channel availability of nearby base stations that are parts of other different ASN(s), the physical operating characteristics of nearby base stations within a service area, current configuration of nearby base stations and access networks that may be accessible to the wireless device, the current and/or recent air interface and/or network resource loading of nearby base stations, and others.

At step 208, the wireless device selects a connection based on the first broadcast message and/or broadcast messages from other access service networks. For example, the connection may be to a base station of the first access network, or to a base station of other access networks. Depending on the specific application, the selection of the base station may be based on various factors. For example, factors such as channel availability, wireless strength, and other characteristics may be weighted to determine which connection is most suitable.

After a wireless connection is selected, the wireless device may use the connection to perform various tasks, such as registering the connection and using it for data and/or voice transmission.

Figure 1:
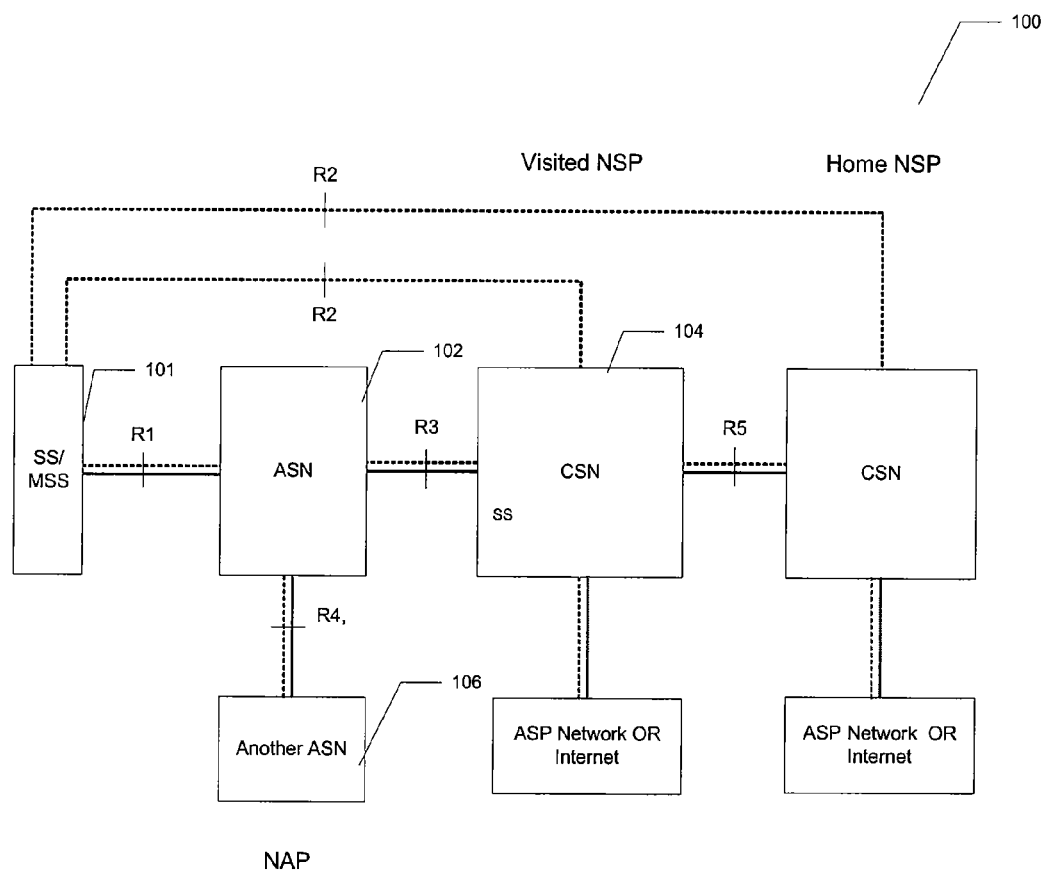
FIG. 1 is a simplified diagram illustrating a conventional telecommunication network.

In another embodiment, a wireless system that includes, among other things, an access service network and a wireless device. The access network is connected to a content service network. The first access network includes a base station. The base station is configured to provide wireless access to wireless devices within a first region through a plurality of communication channels. The plurality of communication channels includes a broadcast channel. The first access network is configured to send broadcast messages through the broadcast channel. The broadcast message includes a first broadcast message. For example, the first broadcast message includes channel availability information. As merely an example, the access network can be implemented using substantially the same hardware components of the ASN 102 in FIG. 1, with various software and/or hardware upgrades.

The wireless device, the wireless device including an antenna and a wireless interface. The wireless interface is adapted to receive at least the first broadcast message. The wireless device includes a processor. The processor is configured to process at least the first broadcast message and select a wireless connection based at least one the first broadcast message. The wireless device is adapted to connect to the selected wireless connection through the wireless interface.

In a specific embodiment, the present invention provides a method for radio resource status update. Among other things, the method can be used by RRC to inform a Serving BS about the list of Neighbor BSs which are potential HO Target Base Stations for any MS's being served by the SBS, including the information about their radio resource status. This primitive can also be used by RRC in NCMS to enforce a change of the Permutation Zone parameters for a group of BSs. For this purpose, the NCMS may send this C-RRM-IND message to each of the BSs in the group in a synchronized way, thereby informing each BS about i) the Permutation Zone parameters to be used by this BS, and ii) the Per-mutation Zone Parameters of neighboring BSs, together with an indication about the percentage of still available radio resources in these Permutation Zones. The BS may use this detailed neighbor BS information at the MAC layer for optimized scheduling.

As an example, the embodiment is implemented using program instructions:

C-RRM-IND

```
(
    Event_Type: Neighbor-BS Radio Resource Status Update,
    Destination: BS,
    Attribute_List:
        N_NEIGHBORS,
        For all BSs in the BS List:
        BSID,
        N_PERMUTATION_ZONES,
        For all Permutation Zones:
            OFDMA symbol offset,
            Permutation scheme,
            Permutation Zone Subchannels Bitmap,
            Available Radio Resource,
            Radio Resource Fluctuation,
        DCD Configuration Change Count,
        UCD Configuration Change Count
)
```

N NEIGHBORS
Number of neighbor BS's
BSID
Unique identifier of BS
N_PERMUTATION_ZONES
Number of radio frame subsections for which the spare capacity will be indicated. A value of 1 indicates that the entire DL and UL radio subframe is considered to be a single permutation zone each, in which case the DL/UL Available Radio Resource indicators cover the fall DL and UL radio subframes.
FDMA Symbol Offset
Denotes the start of the zone (counting from the frame preamble and starting from 0)
Permutation Scheme
Denotes permutation scheme used in current permutation zone. The following types are possible:
  DL PUSC permutation
  DL FUSC permutation
  DL Optional FUSC permutation
  DL AMC
  DL TUSC1
  DL TUSC2
  UL PUSC
  UL AMC
Permutation Zone Subchannel Bitmap
Indicates the subchannels available for transmission in this Permutation Zone at the respective BS.
Available Radio Resource
Percentage of reported average available sub channels and symbols resources per frame. If N_PERMUTATION_ZONES>1, the indicator covers a permutation zone instead of the entire DL or UL radio subframe.
Radio Resource Fluctuation
Radio Resource Fluctuation is used to indicate the degree of fluctuation in DL and UL channel data traffic throughputs. If N_PERMUTATION_ZONES>1, the indicator covers a permutation zone instead of the radio frame. When Radio Resource Fluctuation is set to 0, it implies that the DL and UL data traffic is constant in data throughput. Hence, there is no fluctuation in Available Radio Resource. When Radio Resource Fluctuation is set to maximum value 255, the data traffic is very volatile in nature which makes the Available Radio Resource unpredictable. The Radio Resource Fluctuation for all traffic models should be in the range of 0 to 255.
DCD Configuration Change Count
This represents the Neighbor BS current Downlink Channel Descriptor (DCD) configuration change count
UCD Configuration Change Count
This represents the Neighbor BS current Uplink Channel Descriptor (UCD) configuration change count The NCMS (BS side) use this primitive to forward aggregated Neighbor BS information to each of the BSs which are under control of the NCMS.

The BS uses the information for updating the MOB_NBR-ADV message at the radio interface. In addition the BS may use the information for improving the efficiency of its MAC and PHY functions.

It is to be appreciated that the various embodiments of the present invention provide advantages over conventional techniques. In various embodiments, the present invention provides a scheme for efficiently detect and select wireless connection through the use of broadcast messages. Among other things, by using broadcast messages, wireless devices looking for wireless connection does not have to scan for available channels, but only to select available channels based on information indicated by the broadcast messages. In comparison to conventional techniques, embodiments of the present invention are more efficient, saving time, energy, and network resources. In addition, it is to be appreciated that embodiments of the present invention can be implemented for conventional network techniques and standards. For example, various embodiments of the present invention are compatible with conventional techniques and easily implemented. There are other benefits as well.

It is also understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A wireless communication system, the system comprising:
a first access network, the first access network being connected to a content service network, the first access network including a base station, the base station being configured to provide wireless access to wireless devices within a first region through a plurality of communication channels, the plurality of communication channels including a broadcast channel, the first access network being configured to send a plurality of broadcast messages through the broadcast channel with each message sent after a predetermined time interval, the broadcast message including a first broadcast message, the first broadcast message including current channel availability information;
and a wireless device, the wireless device including an antenna, the wireless device including a wireless interface, the wireless interface being configured to receive at least the first broadcast message, the wireless device including a processor, the processor being configured to process at least the first broadcast message and select a wireless connection based at least one the first broadcast message, the wireless device being configured to connect to the selected wireless connection through the wireless interface.

2. The system of claim 1 wherein the first broadcast message further includes information related to physical characteristics of the base station.

3. The system of claim 1 wherein the first broadcast message further 2 includes information related to a current configuration of the base station.

4. The system of claim 1 further comprising a plurality of access networks, wherein the first broadcast message including information for the plurality of access network.

5. The system of claim 1 wherein the system is compatible with a WiMAX standard.

6. A method for performing network detection and selection in a wireless network, the method comprising:
   providing a content service network;
   providing a first access network, the first access network being connected to the content service network, the first access network including a base station, the base station being configured to provide wireless access to wireless devices within a first region through a plurality of communication channels;
   allocating a broadcast channel from the plurality of communication channels;
   providing a wireless device, the wireless device including an antenna, the wireless device including a wireless interface;
   sending a plurality of broadcast messages with each message sent after a predetermined time interval by the first access network, wherein each broadcast message including current channel availability information;
   receiving each broadcast message from the first access network by the wireless device;
   processing each received broadcast message by the wireless device;
   selecting a wireless connection based at least one the first broadcast message.

7. The method of claim 6 wherein the wireless device performs a 2 handover process from a second access network.

8. The method of claim 6 wherein the wireless network is a WiMAX network.

9. The method of claim 6 further comprising:
   receiving a second broadcast message from a second access network by the wireless device;
   processing the second broadcast message;
   selecting the wireless connection based on at least the first broadcast message and the second broadcast message.

10. The method of claim 6 wherein the first broadcast message includes information associated with a second access network.

11. The method of claim 6 further comprising:
   determining connection characteristics for a plurality of access service networks by the wireless device based on the first broadcast message;
   comparing the connection characteristics;
   selecting the wireless connection based on the connection characteristics.

12. The method of claim 6 further comprising connecting to the wireless connection by the wireless device.

\* \* \* \* \*

UNITED STATES PATENT AND TRADEMARK OFFICE
CERTIFICATE OF CORRECTION

PATENT NO.       : 8,743,766 B2            Page 1 of 1
APPLICATION NO.  : 11/935278
DATED            : June 3, 2014
INVENTOR(S)      : Phillip Barber It is certified that error appears in the above-identified patent and that said Letters Patent is hereby corrected as shown below:

In the Claims

In Col. 8, line 61, claim 1, delete "one" and insert --on--.
In Col. 10, line 3, claim 6, delete "one the first" and insert --on the received--.
In Col. 10, line 14, claim 9, delete "first" and insert --received--.
In Col. 10, line 16, claim 9, delete "first" and insert --received--.
In Col. 10, line 22, claim 11, delete "first" and insert --received--.

Signed and Sealed this
Nineteenth Day of August, 2014

Michelle K. Lee
*Deputy Director of the United States Patent and Trademark Office*